United States Patent Office 3,261,696
Patented July 19, 1966

3,261,696
ZIRCONIA BASED FOAM INSULATING
MATERIAL AND METHOD
Robert E. Wiegert, Middletown, and Thomas J. Byrne, Franklin, Ohio, assignors to The Aeronca Manufacturing Corporation, Middletown, Ohio, a corporation of Ohio
No Drawing. Filed Oct. 27, 1964, Ser. No. 406,911
8 Claims. (Cl. 106—40)

This application is a continuation-in-part of our copending application Serial No. 171,581, filed February 7, 1962, now U.S. Patent 3,223,538.

This invention relates to foamed or cellular insulating materials principally constituted by a composite of zirconia, zirconium phosphate, alumina, and aluminum phosphate.

A principal objective of this invention has been to provide a foamed insulating material especially adapted for use as a heat shield at temperatures in the 2500–3300° F. range, and which is characterized by relatively low density, low thermal conductivity, excellent thermal shock resistance, and high strength throughout the 2500–3300° F. range in use.

The product of this invention is especially adapted for use as a load-bearing low density highly insulative material. As such, it may be used in the manufacture of nuclear reactor coolant lines to reinforce thin corrosion resistant metal alloy tubing therein, and in the production of space vehicle heat shields.

The development or re-entry vehicles, that is, vehicles which can re-enter the earth's atmosphere from space at very high speeds and land safely, has presented a need for heat shielding materials to protect the vehicle, or certain critical portions of it, from the extremely high temperatures generated by the severe aerodynamic heating which accompanies re-entry. The criticality of the weight factor in space vehicle design necessitates the use of insulating materials which are of low density and low thermal conductivity. Moreover, the rate of the frictional heating which occurs during re-entry is so rapid that only materials of excellent thermal shock resistance are of utility for this purpose.

In the use as a space vehicle heat shield, the insulating material may be subjected to severe mechanical stresses, for example, resulting from very rapid deceleration upon re-entry. The shield must be capable of withstanding such forces without cracking or collapsing during exposure in its operative temperature range.

Most prior zirconia insulating materials suitable for these applications have been relatively heavy per unit volume, typically being in the range of 120 to 269 lbs./ft.$^3$, and display relatively high thermal conductivities, typically in the range of 3.5 to 10.5 B.t.u./hr./ft.$^2$/° F./inch.

Certain cellular (as opposed to unfoamed) compositions incorporating zirconia or alumina have also been known, but their production has been difficult because of the rather critical problem of stabilizing the foam until it can be set or hardened. The production of previous zirconia or alumina foams has required the incorporation of anti-slumping compounds, foam stabilizing agents, setting agents, and/or organic cell producing compounds.

The zirconia based foam compositions in accordance with this invention are characterized by densities in the range of about 80 to 90 pounds per cubic foot and thermal conductivities in the range of about 2 to 2.5 B.t.u./hr./ft.$^2$/° F./inch at temperatures in the 0–3000° F. range.

The composite foam of this invention demonstrates lower densities yet better mechanical strength and resistance to thermal shock across the 2500–3000° F. range in comparison to prior zirconia foams. Oddly, prior foams, even those of higher zirconia content, have tended to crack or degrade in tests when subjected to temperatures in this range, and have been of relatively poor strength even though they may demonstrate adequate strength in higher ranges, for example 3000–3300° F. Thus, this invention provides a foam system which is characterized by high strength over a broader range than prior zirconia or alumina foams.

In further contrast to prior refractory oxide foam systems, in the practice of this invention the inclusion of special additives to prevent foam slumping or sagging is not required.

We have empirically discovered that the insulating characteristics and mechanical strength properties of a zirconia based foam over the 2500–3300° F. operating range can be enhanced by the addition in controlled quantity of alumina into the reaction composition.

Simply put, in the practice of this invention, zirconia, alumina, and powdered aluminum metal are first mixed in certain proportions to be specified. This mixture is reacted under controlled conditions with orthophosphoric acid ($H_3PO_4$), and water, and is cast in a mold or form in which it sets, producing a self-supporting cellular body which is then hardened or cured at temperatures in the approximate range of 150–800° F.

In overall terms, the phosphoric acid reacts with the oxides of aluminum and zirconium to form the corresponding phosphates:

$$Al_2O_3 + 2H_3PO_4 \rightarrow 2AlPO_4 + 3H_2O$$
$$3ZrO_2 + 4H_3PO_4 \rightarrow Zr_3(PO_4)_4 + 6H_2O$$

Water is produced as a by-product of each reaction.

These reactions are highly exothermic, and the released heat vaporizes some of the water which is present in the reaction slurry. The vapor so formed is partly responsible for the foaming that thereupon takes place.

The 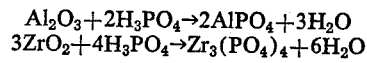 reacts with the phosphoric acid to produce aluminum phosphate and hydrogen:

$$2Al + 2H_3PO_4 \rightarrow 2AlPO_4 + 3H_2\uparrow$$

The released hydrogen apparently contributes, together with water vapor, to the reaction of the foam structure. The evolved gases are released as bubbles throughout the reaction mass. Provided the correct proportions of ingredients are used, the foam is stable even in the absence of a stabilizing or setting agent, and in a short time (typically about an hour) the heat released by the reactions drives off most of the excess water and gels or stabilizes the product, so that the cellular structure is preserved during casting and hardening. The reacted mass is a homogeneous composite of zirconium and aluminum phosphates probably with lesser amounts of both unreacted alumina and zirconia.

The proportions of the components of the reaction mixture to effect suitable results are rather critical. Castable zirconia, preferably of −60 mesh particle size, is utilized in the amount of about 76–80 parts per hundred by weight. Calcined alumina, preferably in tabular form, should constitute about 7.5–10.0 parts per hundred. Metallic aluminum in finely divided form is added in the amount of about .1–.2 part. The phosphoric acid is preferably in 85% aqueous solution and constitutes 8.0–10.0 parts. Additional water is added in the amount of about 3.1–5.0 parts.

More specifically, in the practice of our invention the dry constituents, that is, the zirconia, alumina, and aluminum metal powder are first thoroughly mixed. Next, phosphoric acid and water, preferably mixed and cooled to room temperature to dispel the heat of mixing, are added to the dry mixture. The resultant slurry is mixed slowly, preferably for approximately five minutes, and then mixed more vigorously for an additional five minutes. It is permitted to set for at least about one hour and is then poured or cast into the desired form, which may be an annular space within reactor tubing or the cells of a honeycomb panel.

The phosphoric acid performs at least two functions: it reacts to release gases which cause foaming and impart a cellular structure to the material, and its phosphate reaction products bond the mass to form a coherent hard body. The oxide constituents present in the dry mixture do not completely react with the acid since in total they are present in stoichiometric excess. For this reason, zirconia and probably alumina are present in the final product, together with their phosphates.

When the phosphoric acid is added to the mixture of dry powders, foaming begins almost immediately. If the mixture is not disturbed or agitated while foaming occurs, the product will be highly foamed and of relatively low density. Agitation of the reaction mixture, i.e. stirring, mixing, pouring, or other handling during the reaction tends to disrupt the foam to some extent and has the general effect of increasing the density and thermal conductivity of the product. We prefer that the reaction mixture be permitted to stabilize itself for about an hour at room temperature before it is cast to final form. When the mix is added to the form the form may be vibrated so that the mix will completely fill the mold, although this tends to increase density somewhat.

The foamed structure thereafter requires curing at controlled conditions to impart better strength and rigidity to it. Chemically, curing has the effect of driving off the water of mixture and the by-product water of the acid reaction, thus maintaining the proper viscosity and preventing collapse of the foamed product. Also, the removal of the by-product water of reaction forces the phosphoric acid reaction to completion by preventing the establishment of an equilibrium condition.

According to a preferred method of curing, the mixture is first heated to a temperature of 150° F. for about 8 hours, then at a temperature of 200° F. for about 8 hours, and finally at a temperature of about 800° F. for 16 hours. It is contemplated, however, that other cure cycles can be used, including shorter or longer times within this general range. Higher initial temperatures tend to increase density and are generally unnecessary and relatively undesirable.

Following is a specific example of a preferred composition and cure cycle in accordance with the discovery we have made:

| Component: | Parts by weight |
|---|---|
| Castable $ZrO_2$ | 78.0 |
| Tabular $Al_2O_3$ | 8.7 |
| Powdered aluminum | .1 |
| Water | 4.1 |
| 85% $H_3PO_4$ | 9.1 |
|  | 100.0 |

As can be calculated from the above formula, our compositions may be characterized as having a total $ZrO_2+Al_2O_3$ content which is in stoichiometric excess in relation to the proportion of phosphoric acid. By reason of this excess, a substantial amount of zirconia and/or alumina is present in the final product, and may be considered to be present in an aluminum and zirconium phosphate matrix.

Zirconia in a suitable form for use in the practice of this invention is preferably of the castable type, for example, a 99% pure, lime stabilized zirconia.

The alumina may be a calcined alumina. A suitable form of powdered aluminum metal comprises a mixture of commercially available aluminum powders of different sizes which have been mixed thoroughly by ball milling. Other forms may be used, although minor adjustment of the reaction time and temperature may be necessary for best results. As noted, the phosphoric acid is preferably an 85% aqueous solution, which is further diluted with additional water. Essentially no water is present in the castable zirconia solids.

Although the optimum processing procedure will vary somewhat depending upon the size of the batch which is to be mixed, a batch of about 3000 grams may be prepared by mixing the dry materials for ten minutes or more to insure thorough mixing. The acid is added to the water and the solution cooled to room temperature. The diluted acid is added to the dry materials, and the resulting slurry is stirred or mixed mechanically for five minutes at low speed and then for five additional minutes at a higher speed. The evolution of heat begins as soon as the acid is added to the dry materials, and for best porosity and density we find it to be important to maintain the temperature of the mixture within the approximate 100–120° F. range during the foaming reaction, for example, by the application of water cooling to the container in which the mixing is conducted. Higher temperatures cause more accelerated foaming, resulting in a more dense product. Lower temperatures give a delayed reaction and large voids. The mix is allowed to react or stabilize for one hour, and is then poured into a mold. If the material is to be applied to a honeycomb panel, for example, for use as a space vehicle heat shield, it is preferable to vibrate the panel while the mix is being applied, so as to remove entrapped air and to cause the rather heavy fluid to completely fill the mold. The vibrating operation should be as brief as possible, and should not exceed two or three minutes. Restraining fixtures may be applied to prevent the mixture from overflowing the mold and to control height of foam reaction. This provides control of density and/or weight per unit area. The product is then cured according to the schedule given above. Curing may alternatively be carried out by heating the product to 175° F. for 6 hours and then to 800° F. for 16 hours.

We have found that the best results are obtained with the 10 minute total slurry mix time as specified above, followed by a one hour stabilizing period at room temperature. Oddly, decreasing the mix time tends to result in higher or excessive foaming. Generally speaking, an increase in temperature during the stabilizing period (i.e., above room temperature) tends to result in collapse of the foam structure.

In tests, a panel prepared with this composition was exposed to an oxy-propane burner, with the conditions of exposure being 3500° F. (front face uncorrected optical temperature), noise 140 to 160 db, and static pressure 2 to 3 lbs./ft.². The foamed ceramic, in particular, and the panel configuration, in general, survived with no apparent degradation.

We have empirically discovered that insulating material in accordance with the invention displays physical properties which are highly desirable. Mechanical strength is good in the lower temperature ranges, i.e., below 2500° F., due largely to the presence of the phosphate compounds. Above 2500° F., the phosphate compounds tend to lose part of their effectiveness as a bonding agent. Although we do not wish to be limited in this regard, we believe that the unreacted alumina permits some particle sintering to occur above 2500° F., and up to about 3000° F. This factor, in combination with the slower degradation of the aluminum phosphate as against zirconium phosphate, contributes greatly to the observed strength of the material in that temperature range. The relatively high strength in this temperature range has been demonstrated by comparative tests wherein the composition of this invention displayed better strength across the 2500–3000° F. range than did similar $ZrO_2$-$Zr_3(PO_4)_4$ compositions containing no $Al_2O_3$ and only a small part of $AlPO_4$. We also believe that when temperatures above 3000° F. are reached the alumina begins to lose effectiveness as a bonding agent, but that the unreacted zirconia then begins to sinter or self-bond and maintains strength of the product until still higher temperatures are reached.

In other words, if the alumina were omitted in the batch the material might be stable and strong above about 300° F. And, if the zirconia were omitted, the resultant product would only be capable of withstanding temperatures up to about 3000° F.

The embodiments of the invention in which an exclusive property or privilege is claimed are defined as follows:

1. The method which comprises, preparing a mixture which consists essentially of about 76–80 parts per hundred by weight of castable zirconia, about 7.5–10.0 parts calcined granular alumina, and .1–.2 part powdered aluminum metal, adding to said mixture a phosphoric acid solution corresponding to about 8.0–10.0 parts phosphoric acid in 85% aqueous solution and about 3.1–5.0 parts additional water, thereby producing a foaming reaction in which water vapor and hydrogen are evolved which impart a cellular structure to the reaction mass, permitting the reaction mass to stabilize itself at room temperature for at least about one hour, and thereafter hardening the resultant product at a temperature in the range of about 150–800° F. for a period of hours.

2. The method of claim 1 wherein said hardening is carried out by heating the product of said reaction to about 150° F. for about 8 hours, next to about 200° F. for about 8 hours, and then to about 800° F. for about 16 hours.

3. The method which comprises, preparing a mixture which consists essentially of about 76–80 parts per hundred by weight of castable zirconia, about 7.5–10.0 parts calcined granular alumina, and .1–.2 part powdered aluminum metal, thoroughly mixing the same, preparing a phosphoric acid solution corresponding to about 8.0–10.0 parts 85% phosphoric acid diluted with about 3.1–5.0 parts additional water, adding said acid solution to said dry mixture, thereby causing a foaming reaction in which water vapor and hydrogen are evolved, cooling the foaming reaction mass to prevent its temperature from exceeding about 100–120° F. until further foaming ceases, thereafter permitting the mixture to stand at about room temperature for a period of about one hour, casting the mixture in a mold of desired configuration, and thereafter hardening the resultant product in said mold at a temperature in the range of about 150–800° F. for a period of hours.

4. The method which comprises, preparing a mixture which consists essentially of about 78.0 parts per hundred weight of castable zirconia, about 8.7 parts calcined granular alumina, and .1 part powdered aluminum metal, thoroughly mixing the same, preparing a phosphoric acid solution corresponding to about 9.1 parts 85% phosphoric acid diluted with about 4.1 parts additional water, adding said acid solution to said dry mixture, thereby causing a foaming reaction in which water vapor and hydrogen are evolved, cooling the foaming reaction mass to prevent its temperature from exceeding about 100–120° F. until further foaming reaction ceases, thereafter permitting the mixture to stand at about room temperature for a period of at least one hour, casting the mixture in a mold of desired configuration, and thereafter hardening the resultant product in said mold at a temperature in the range of about 150–800° F. for a period of hours.

5. The method of claim 4 wherein as the mixture is poured into said mold the mold is vibrated for a period not in excess of about 2 to 3 minutes to cause said mixture to uniformly fill said mold.

6. The method of claim 4 wherein immediately after said acid solution is added to said dry mixture the resultant slurry is mixed for about five minutes at a relatively low speed, and then for a second period of about five minutes at a higher speed.

7. As a new composition of matter, the product of the method of claim 1.

8. The composition of matter defined in claim 7 wherein said mixture consists essentially of about 78.0 parts per hundred by weight of castable zirconia, about 8.7 parts alumina, about 0.1 part powdered aluminum metal, about 9.1 parts phosphoric acid in 85% aqueous solution, and about 4.1 parts additional water.

References Cited by the Examiner
UNITED STATES PATENTS

| | | | |
|---|---|---|---|
| 2,341,561 | 2/1944 | Kinzie | 106—41 |
| 2,966,421 | 12/1960 | Zimmerman et al. | 106—40 |
| 2,992,930 | 7/1961 | Wheeler et al. | 106—40 |
| 3,041,190 | 6/1962 | Griffith et al. | 106—40 |

TOBIAS E. LEVOW, *Primary Examiner.*

H. M. McCARTHY, *Assistant Examiner.*